(12) United States Patent
Fujimura et al.

(10) Patent No.: US 10,997,493 B2
(45) Date of Patent: May 4, 2021

(54) INFORMATION PROCESSING DEVICE AND INFORMATION PROCESSING METHOD

(71) Applicant: Panasonic Intellectual Property Corporation of America, Torrance, CA (US)

(72) Inventors: Ryota Fujimura, Kanagawa (JP); Hiroaki Urabe, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 60 days.

(21) Appl. No.: 16/435,914

(22) Filed: Jun. 10, 2019

(65) Prior Publication Data

US 2019/0385044 A1 Dec. 19, 2019

(30) Foreign Application Priority Data

Jun. 15, 2018 (JP) .............................. JP2018-114973

(51) Int. Cl.
*G06N 3/04* (2006.01)
*G06K 9/62* (2006.01)
*G06N 3/08* (2006.01)

(52) U.S. Cl.
CPC ......... *G06N 3/0454* (2013.01); *G06K 9/6228* (2013.01); *G06N 3/08* (2013.01)

(58) Field of Classification Search
CPC ........ G06N 3/04; G06N 3/0454; G06N 3/063; G06N 3/08; G06N 3/084; G06K 9/6228; G06K 9/4628; G05B 13/027; G10L 15/16
See application file for complete search history.

(56) References Cited

U.S. PATENT DOCUMENTS

| | | | |
|---|---|---|---|
| 7,991,719 B2* | 8/2011 | Ishii ..................... | G06K 9/4628 706/28 |
| 2018/0068218 A1* | 3/2018 | Yoo ....................... | G06K 9/4604 |

(Continued)

FOREIGN PATENT DOCUMENTS

JP  2016-31747  3/2016

OTHER PUBLICATIONS

Xin Li et al., "FoveaNet: Perspective-aware Urban Scene Parsing", Aug. 8, 2017, <URL:https://arxiv.org/pdf/1708.02421.pdf.>.

(Continued)

*Primary Examiner* — Chan S Park
*Assistant Examiner* — Daniel C Chang
(74) *Attorney, Agent, or Firm* — Wenderoth, Lind & Ponack, L.L.P.

(57) ABSTRACT

An information processing device includes: a processor configured to: obtain sensor data; determine partial data; input the sensor data to an input layer of a first neural network recognition model; input the partial data to an input layer of a second neural network recognition model; align second intermediate output data from a second intermediate layer of the second neural network recognition model, relative to first intermediate output data from a first intermediate layer of the first neural network recognition model; generate intermediate input data from the first intermediate output data and the second intermediate output data aligned; and input the intermediate input data to a third intermediate layer of the first neural network recognition model subsequent to the first intermediate layer.

10 Claims, 9 Drawing Sheets

(56) References Cited

U.S. PATENT DOCUMENTS

2018/0373980 A1* 12/2018 Huval ............... G06K 9/00805
2019/0156157 A1*  5/2019 Saito ................. G06K 9/00369
2020/0285965 A1*  9/2020 Kim .......................... G06N 3/08

OTHER PUBLICATIONS

Extended European Search Report dated Nov. 11, 2019 in corresponding European Patent Application No. 19177686.3.
Wei et al., "Mask-CNN: Localizing parts and selecting descriptors for fine-grained bird species categorization", Pattern Recognition, vol. 76, Oct. 2017.
Fu et al., "Look Closer to see Better: Recurrent Attention Convolutional Neural Network for Fine-grained Image Recognition", IEEE Conference on Computer Vision and Pattern Recognition, Jul. 2017.
Branson et al., "Bird Species Categorization Using Pose Normalized Deep Convolutional Nets", Jun. 2014.
Dou et al., "Coarse-to-Fine Trained Multi-Scale Convolutional Neural Networks for Image Classification", International Joint Conference on Neural Networks (IJCNN), Jul. 2015.
Farabet et al., "Learning Hierarchical Features for Scene Labeling", IEEE Transactions on Pattern Analysis and Machine Intelligence, vol. 35, No. 8, Aug. 2013.

* cited by examiner

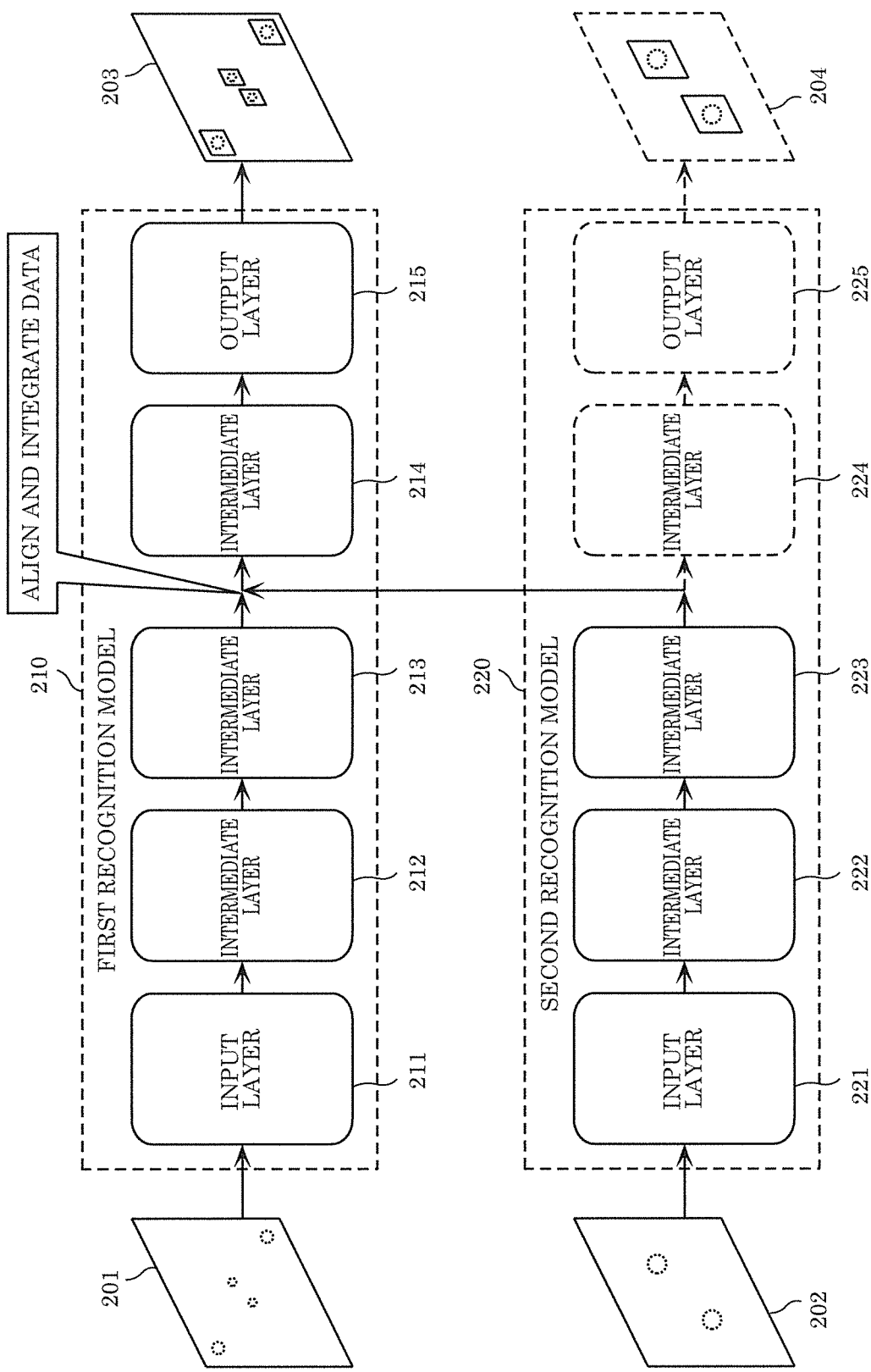

INFORMATION PROCESSING DEVICE AND INFORMATION PROCESSING METHOD

CROSS REFERENCE TO RELATED APPLICATION

This application claims the benefit of priority of Japanese Patent Application Number 2018-114973 filed on Jun. 15, 2018, the entire content of which is hereby incorporated by reference.

BACKGROUND

1. Technical Field

The present disclosure relates to an information processing device, for instance.

2. Description of the Related Art

Patent Literature (PTL) 1 (Japanese Unexamined Patent Application Publication No. 2016-31747) has proposed a technology for implementing appropriate recognition processing not only on typical features of an image, but also on specific features, while maintaining the features. Non-Patent Literature (NPL) 1 (Xin Li and four other authors. (2017, August 8). "FoveaNet: Perspective-aware Urban Scene Parsing" has proposed integrating the result of recognizing the entire image and the result of recognizing a portion of the image.

SUMMARY

However, conventional technology uses a plurality of neural network recognition models (hereinafter, also simply referred to as recognition models) for performing recognition processing on sensor data such as an image, and thus requires more computational resources for processing, in comparison with the case where a single recognition model is used.

In view of this, the present disclosure is to provide an information processing device which can inhibit an increase in computational resource while improving recognition performance.

An information processing device according to an aspect of the present disclosure includes: a processor configured to: obtain sensor data from a sensor; determine partial data which is a portion of the sensor data; input the sensor data to an input layer of a first neural network recognition model; input the partial data to an input layer of a second neural network recognition model; align second intermediate output data from a second intermediate layer of the second neural network recognition model, relative to first intermediate output data from a first intermediate layer of the first neural network recognition model; generate intermediate input data from the first intermediate output data and the second intermediate output data aligned; and input the intermediate input data to a third intermediate layer of the first neural network recognition model subsequent to the first intermediate layer.

Note that these general and specific aspects may be implemented using a system, a device, a method, an integrated circuit, a computer program, or a computer-readable recording medium such as a CD-ROM, or any combination of systems, devices, methods, integrated circuits, computer programs, or recording media.

An information processing device according to an aspect of the present disclosure, for instance, can inhibit an increase in computational resource while improving recognition performance.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3A is a schematic diagram illustrating a first recognition model and a second recognition model according to the embodiment;

Figure 1:
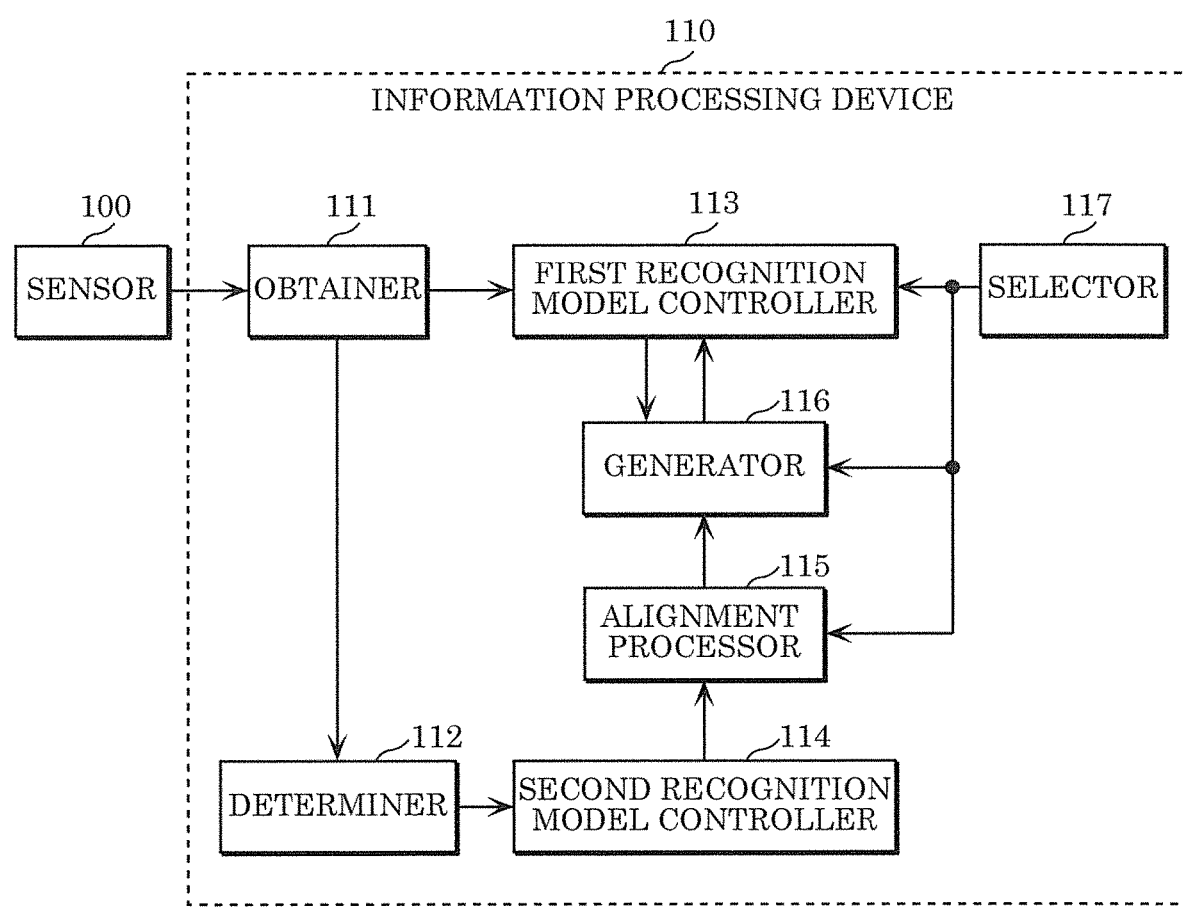
FIG. 1 is a block diagram illustrating a configuration of an information processing device according to an embodiment.

DESCRIPTION OF EMBODIMENTS (Underlying Knowledge Forming Basis of the Present Disclosure)

In recent years, neural network recognition models have begun to be used. A neural network is a mathematical model which imitates nerves of a living thing, and the mathematical model may include a plurality of layers. A neural network recognition model is a model constituted by a neural network, and is a model for performing recognition processing. For example, an image is input to a neural network recognition model, and an object in the image is recognized by the neural network recognition model.

The technologies disclosed in PTL 1 and NPL 1 relate to such neural network recognition models.

For example, PTL 1 proposes a technology for implementing appropriate processing not only on a typical feature of an image, but also on a specific feature, while maintaining the features.

Specifically, the information processing device according to PTL 1 inputs an output from the M-th layer of a second hierarchical neural network to the input layer of a first hierarchical neural network. Then, the information processing device weights an output from the output layer of the first hierarchical neural network, using an output from a neuron of interest of the first hierarchical neural network. Then, the information processing device integrates the result of weighting and the output from the M-th layer of the second hierarchical neural network, and inputs the resultant output to the (M+1)-th layer of the second hierarchical neural network.

Accordingly, the information processing device can integrate the output from the output layer of the first hierarchical neural network and the output from the M-th layer of the second hierarchical neural network, based on the output from the neuron of interest for the specific feature. Stated differently, the information processing device can integrate the output from the output layer of the first hierarchical neural network and the output from the M-th layer of the second hierarchical neural network, based on the specific feature. Accordingly, the information processing device can perform processing for the specific feature.

NPL 1 proposes integrating the result of recognizing the entire image and the result of recognizing a portion of the image. Specifically, a region of interest is cut out from an input image. Then, the entire input image is recognized by the neural network, and furthermore, the region of interest is recognized by another neural network in more detail. Then, the result of recognizing the entire input image and the result of recognizing the portion of the image are integrated.

Accordingly, a final recognition result obtained by combining the result of recognizing the entire image and the result of recognizing the portion of the image in more detail. Accordingly, even when small objects are densely included in a portion of an image and large objects are scattered in other portions, those objects can be efficiently recognized.

However, the amount of processing increases if the recognition processing on sensor data such as an image is not efficiently performed.

For example, in the information processing device according to PTL 1, an output from the M-th layer of the first hierarchical neural network is an input to the second hierarchical neural network as it is, and thus processing by the second hierarchical neural network is performed on the entire output from the M-th layer. If only a portion of the output from the M-th layer contributes to recognition processing, improvement in the recognition processing performed by the information processing device is limited. On the other hand, the information processing device substantially sequentially performs processing using the first hierarchical neural network and processing using the second hierarchical neural network. Accordingly, the time for and the amount of computation increase by the amount of additional processing by the second hierarchical neural network. Accordingly, it is difficult to inhibit an increase in the computational resource, while improving recognition performance.

According to NPL 1, the result of recognizing the entire image and the result of recognizing a portion of the image are integrated as described above. Specifically, recognition processing on the entire sensor data and recognition processing on a portion of the sensor data are performed separately, and thereafter the result of the recognition processing on the entire sensor data and the result of the recognition processing on the portion of the sensor data are integrated. Stated differently, two recognition processes are performed separately. Thus, this doubles the amount of processing as compared with the case where one recognition process is performed, although recognition performance improves.

In view of this, an information processing device according to an aspect of the present disclosure includes: an obtainer which obtains sensor data from a sensor; a determiner which determines partial data which is a portion of the sensor data; a first recognition model controller which inputs the sensor data to an input layer of a first neural network recognition model; a second recognition model controller which inputs the partial data to an input layer of a second neural network recognition model; an alignment processor which aligns second intermediate output data from a second intermediate layer of the second neural network recognition model, relative to first intermediate output data from a first intermediate layer of the first neural network recognition model; and a generator which generates intermediate input data from the first intermediate output data and the second intermediate output data aligned. The first recognition model controller inputs the intermediate input data to a third intermediate layer of the first neural network recognition model subsequent to the first intermediate layer.

Accordingly, the information processing device can appropriately generate the intermediate input data from the first intermediate output data and the aligned second intermediate output data. Accordingly, the information processing device can appropriately integrate the first intermediate output data obtained in the recognition processing on the entire sensor data and the second intermediate output data obtained in the recognition processing on the portion of the sensor data. Accordingly, the intermediate input data obtained by the appropriate integration can be used as an input to the third intermediate layer in the recognition processing of the first recognition model, and recognition performance can be improved. The recognition processing of the second recognition model can be terminated before the processing is completed, and an increase in the computational resource such as the amount of computation and memory usage can be inhibited.

For example, the sensor may be an image sensor, and the sensor data may be an image.

Accordingly, the information processing device can appropriately integrate the first intermediate output data obtained in the recognition processing on the entire image, and the second intermediate output data obtained in the recognition processing on a portion of the image. In the image recognition processing using a recognition model, the resolution or the size of an input image is often compressed. The compression distorts or destroys an object shown in the image. On the other hand, if the input image is not compressed, the amount of computation and memory usage increase. In view of this, since the information processing device is used for image recognition processing, an increase in the computational resource can be inhibited while improving image recognition performance.

For example, the alignment processor may align the second intermediate output data by adjusting a position or a size of the second intermediate output data to a position or a size of a first region which is a partial region in the first intermediate output data.

Accordingly, the information processing device can appropriately align the second intermediate output data according to the partial region in the first intermediate output data.

For example, the alignment processor may determine the first region according to a region of the partial data in the sensor data, and align the second intermediate output data by adjusting the position or the size of the second intermediate output data to the position or the size of the first region determined.

Accordingly, the information processing device can determine the partial region in the first intermediate output data corresponding to the region of the partial data in the sensor data. Accordingly, the second intermediate output data of the second recognition model which uses the partial data as an input can be appropriately aligned.

For example, the information processing device may further include: a selector which selects the first intermediate layer from among a plurality of layers of the first neural network recognition model.

Accordingly, the information processing device can adaptively select the first intermediate layer for integrating the intermediate data in the recognition processing on the entire sensor data, and the intermediate data in the recognition processing on the portion of the sensor data.

For example, the selector may select the first intermediate layer according to information which the first neural network recognition model and the second neural network recognition model have learned during training.

Accordingly, the information processing device can select the first intermediate layer suitable for the first recognition model and the second recognition model.

For example, the selector may select the first intermediate layer according to computational resource information on a computational resource of the information processing device.

Accordingly, the information processing device can select the first intermediate layer suitable for a computational resource that can be used.

For example, the determiner may determine the partial data according to a parameter of the sensor.

Accordingly, the information processing device can determine, based on the parameter of the sensor, the partial data on which recognition processing is to be performed separately from the entire sensor data and which is expected to contribute to the improvement in recognition performance.

For example, the determiner may determine the partial data according to information indicating operation of or control over a movable object on which the sensor is mounted.

Accordingly, the information processing device can determine, based on operation of or control over a movable object on which the sensor is mounted, the partial data on which recognition processing is to be performed separately from the entire sensor data and which is expected to contribute to the improvement in recognition performance.

For example, an information processing method according to an aspect of the present disclosure may include: obtaining sensor data from a sensor; determining partial data which is a portion of the sensor data; inputting the sensor data to an input layer of a first neural network recognition model; inputting the partial data to an input layer of a second neural network recognition model; aligning second intermediate output data from a second intermediate layer of the second neural network recognition model, relative to first intermediate output data from a first intermediate layer of the first neural network recognition model; generating intermediate input data from the first intermediate output data and the second intermediate output data aligned; and inputting the intermediate input data to a third intermediate layer of the first neural network recognition model subsequent to the first intermediate layer.

Accordingly, intermediate input data may be appropriately generated from the first intermediate output data and the aligned second intermediate output data. Accordingly, the first intermediate output data obtained in the recognition processing on the entire sensor data and the second intermediate output data obtained in the recognition processing on a portion of the sensor data may be appropriately integrated. Accordingly, the intermediate input data obtained by the appropriate integration can be used as an input to the third intermediate layer in the recognition processing of the first recognition model, and recognition performance can be improved. In addition, the recognition processing by the second recognition model can be terminated before the processing is completed, and an increase in the computational resource such as an amount of computation and memory usage can be inhibited.

For example, a program according to an aspect of the present disclosure may be a program for causing a computer to perform the information processing method.

Accordingly, the computer can perform the above information processing method in accordance with the program.

Furthermore, these general and specific embodiments may be implemented using a system, a device, a method, an integrated circuit, a computer program, or a non-transitory computer-readable recording medium such as a CD-ROM, or an arbitrary combination of systems, devices, methods, integrated circuits, computer programs, or recording media.

The following specifically describes embodiments, with reference to the drawings. Note that the embodiments described below each show a general or specific example. The numerical values, shapes, materials, elements, the arrangement and connection of the elements, steps, and the processing order of the steps, for instance, described in the following embodiments are mere examples, and thus are not intended to limit the scope of the claims. Among the elements in the embodiments below, elements not recited in any of the independent claims defining the broadest concept of the present disclosure are described as optional elements.

In the following description, the ordinal numbers such as first, second, and third are often added to elements. Such ordinal numbers are added to the elements in order to identify the elements, and thus do not necessarily correspond to an order intended to have a certain meaning. The ordinal numbers may be replaced, newly given, or removed, as appropriate.

Embodiment

FIG. 1 is a block diagram illustrating a configuration of an information processing device according to the present embodiment. FIG. 1 illustrates sensor 100 and information processing device 110.

Sensor 100 is a detection device and may be constituted by an electric circuit. For example, sensor 100 detects temperature, pressure, magnetism, sound, light, gas, supersonic waves, electromagnetic waves, and others, and outputs sensor data indicating the detection result. Sensor 100 may be an image sensor. In this case, sensor 100 detects light and outputs an image indicating the detection result as sensor data.

Information processing device 110 processes information. For example, information processing device 110 is a computer, obtains sensor data from sensor 100, and performs recognition processing on the sensor data. This recognition processing may also be expressed as prediction processing, estimation processing, inference processing, or identification processing. Through the recognition processing, sensor data may be classified, an object in the sensor data may be detected, and the sensor data may be split according to characteristics.

Specifically, when sensor 100 is an image sensor and sensor data is an image, information processing device 110 performs recognition processing on the image. Through the recognition processing, the image may be classified, an object in the image may be detected, the image may be split according to characteristics, or an explanation of the image may be output in a natural language.

For example, the above recognition processing is useful also to control movable objects such as vehicles. For example, sensor 100 and information processing device 110 may be mounted on a movable object. Information processing device 110 may perform recognition processing on sensor data obtained from sensor 100, and apply the result of the recognition processing to automated driving. The above recognition processing may be applied not only to automated driving, but also to personal authentication and security systems, for instance. Information processing device 110 includes elements for performing such recognition processing.

Specifically, information processing device 110 includes obtainer 111, determiner 112, first recognition model controller 113, second recognition model controller 114, alignment processor 115, generator 116, and selector 117. Note that one or more of the elements may be mounted on an external device different from information processing device 110 or may not be present. In particular, selector 117 may not be present. Furthermore, information processing device 110 may include sensor 100.

Obtainer 111 is an information processor which obtains information, and may be constituted by an electric circuit. Specifically, obtainer 111 obtains sensor data from sensor 100. For example, when sensor 100 is an image sensor and sensor data is an image, obtainer 111 obtains an image from sensor 100 as sensor data.

Obtainer 111 may obtain sensor data from sensor 100 by wire communication or by wireless communication. For example, sensor 100 and information processing device 110 may be connected to each other via a communication line. Obtainer 111 may obtain sensor data from sensor 100 by wire communication via a communication line. Alternatively, obtainer 111 may obtain sensor data from sensor 100 by wireless communication via an antenna.

Obtainer 111 may obtain sensor data from sensor 100 directly or indirectly. For example, the sensor data output from sensor 100 may be stored in a recording medium. Then, obtainer 111 may obtain sensor data from the recording medium.

Obtainer 111 may have an interface such as a communication terminal, an antenna, or an input terminal for obtaining information.

Determiner 112 is an information processor which determines partial data which is a portion of the sensor data, and may be constituted by an electric circuit. For example, recognition processing is performed more accurately on the partial data determined by determiner 112. Determiner 112 may determine partial data which is a portion of the sensor data according to a user instruction. Specifically, determiner 112 may determine partial data which is a portion of the sensor data according to an instruction obtained from a user via obtainer 111.

Alternatively, determiner 112 may determine partial data which is a portion of the sensor data according to a parameter of sensor 100. Here, the parameter of sensor 100 is a position, orientation, and performance of sensor 100, for instance. Determiner 112 may obtain the parameter of sensor 100 via obtainer 111. Then, determiner 112 may determine partial data which is a portion of the sensor data and for which detection precision is assumed to be low, as partial data on which recognition processing is to be performed more accurately, according to a position, orientation, and performance of sensor 100, for instance.

Alternatively, when sensor 100 is mounted on a movable object, determiner 112 may determine partial data which is a portion of the sensor data, according to information on operation of the movable object or information on control over the movable object. Determiner 112 may obtain information on operation of the movable object or information on control over the movable object via obtainer 111.

For example, according to information on operation of a movable object or information on control over a movable object, determiner 112 may determine partial data which is a portion of sensor data and is relevant to operation or control, as partial data on which recognition processing is to be performed more accurately.

Alternatively, determiner 112 may determine partial data which is a portion of sensor data, according to the sensor data. For example, determiner 112 may determine partial data which is a portion of sensor data and for which detection precision is assumed to be low, as partial data on which recognition processing is to be performed more accurately, according to the sensor data.

When sensor data is an image, determiner 112 determines a partial image which is a portion of the image obtained by obtainer 111. For example, recognition processing is performed more accurately on the partial image. Accordingly, the partial image may correspond to a region of interest of the image. Determiner 112 may estimate a vanishing point in an image, and determine a partial image which includes the estimated vanishing point and is a portion of the image, as a partial image on which recognition processing is to be performed more accurately.

First recognition model controller 113 is an information processor which controls the processing on the first recognition model, and may be constituted by an electric circuit. The first recognition model is a neural network mathematical model which includes a plurality of layers and is for performing recognition processing.

Basically, the first recognition model includes a plurality of processing layers including an input layer, an intermediate layer, and an output layer. Data on which recognition processing is to be performed is input to the input layer as input data. Then, resultant data of the recognition processing is output as output data from the output layer. The input layer and the output layer are different processing layers, and a processing layer between the input layer and the output layer is referred to as an intermediate layer. The first recognition model may include a plurality of intermediate layers.

For example, the first recognition model trained using learning data is implemented in first recognition model controller 113. Specifically, the first recognition model trained by a device different from information processing device 110 may be implemented in first recognition model controller 113. Alternatively, first recognition model controller 113 trains the first recognition model implemented in first recognition model controller 113, thus implementing the first learned recognition model in first recognition model controller 113.

Specifically, learning data includes input data, and correct output data for the input data. Then, in training the first recognition model, the input data included in the learning data is input to the input layer of the first recognition model. Then, the first recognition model is updated so that output data from the output layer of the first recognition model is the same as the output data included in the learning data, thus training the first recognition model.

For example, first recognition model controller 113 inputs sensor data obtained by obtainer 111 to the input layer of the first recognition model. First recognition model controller 113 performs processing up to the first intermediate layer of the first recognition model. The first intermediate layer may be predetermined or selected by selector 117 from among a plurality of layers of the first recognition model.

Then, first recognition model controller 113 inputs, to a layer subsequent to the first intermediate layer, intermediate input data generated from, for instance, first intermediate output data from the first intermediate layer of the first recognition model. The layer subsequent to the first intermediate layer is specifically a layer following the first intermediate layer. Then, first recognition model controller 113 performs processing up to the output layer of the first recognition model.

Then, first recognition model controller 113 may output the output data from the output layer of the first recognition model to the outside, or may cause information processing device 110 to operate according to output data from the output layer of the first recognition model. For example, sensor 100 and information processing device 110 may be mounted on a movable object, and information processing device 110 may control operation of the movable object according to the output data from the output layer of the first recognition model.

The first recognition model may be implemented in another device. First recognition model controller 113 may control an input to and an output from the first recognition model, and substantial processing of the first recognition model may be performed by another device.

Similarly to first recognition model controller 113, second recognition model controller 114 is an information processor which controls processing on the second recognition model, and may be constituted by an electric circuit. The second recognition model is a neural network mathematical model which includes a plurality of layers and is for performing recognition processing, similarly to the first recognition model.

Basically, the second recognition model includes a plurality of processing layers including an input layer, an intermediate layer, and an output layer. Data on which recognition processing is to be performed is input to the input layer as input data. Then, the resultant data of the recognition processing is output as output data from the output layer. The input layer and the output layer are different processing layers, and the processing layer between the input layer and the output layer is referred to as an intermediate layer. The second recognition model may include a plurality of intermediate layers.

For example, the second recognition model trained using learning data is implemented in second recognition model controller 114. Specifically, the second recognition model trained by a device different from information processing device 110 may be implemented in second recognition model controller 114. Alternatively, second recognition model controller 114 may train the second recognition model implemented in second recognition model controller 114, thus implementing the second learned recognition model in second recognition model controller 114.

Specifically, learning data includes input data, and correct output data for the input data. Then, in training the second recognition model, the input data included in the learning data is input to the input layer of the second recognition model. Then, the second recognition model is updated so that output data from the output layer of the second recognition model is the same as the output data included in the learning data, thus training the second recognition model.

The first recognition model and the second recognition model may be the same as or different from each other. For example, the first recognition model and the second recognition model may be trained using the same learning data or different learning data.

For example, second recognition model controller 114 inputs partial data obtained by determiner 112 to the input layer of the second recognition model. Second recognition model controller 114 performs processing up to the second intermediate layer of the second recognition model. Then, second intermediate output data from the second intermediate layer is aligned, and the aligned second intermediate output data is used for generating the intermediate input data for the first recognition model.

The above second intermediate layer may be predetermined or selected by selector 117 from among a plurality of layers of the second recognition model. The second intermediate layer may be determined according to the first intermediate layer or may be determined irrespective of the first intermediate layer. Specifically, the ordinal position of the second intermediate layer among the layers of the second recognition model may be the same as the ordinal position of the first intermediate layer among the layers of the first recognition model. Alternatively, the second intermediate layer may be the last intermediate layer of the layers of the second recognition model.

When the second above intermediate layer is predetermined, the input layer up to the second intermediate layer of the second recognition model may be implemented in second recognition model controller 114, and the layer subsequent to the second intermediate layer up to the output layer may not be implemented in second recognition model controller 114.

For example, second recognition model controller 114 inputs, to the input layer of the second recognition model, partial data higher in resolution than the resolution of sensor data input to the input layer of the first recognition model. Accordingly, second recognition model controller 114 can accurately perform recognition processing on the partial data.

Specifically, sensor data the resolution of which is decreased may be input to the input layer of the first recognition model in order to reduce the amount of processing, and partial data may be input to the input layer of the second recognition model without decreasing the resolution of the partial data, for the sake of accurate recognition processing. Alternatively, sensor data may be input as it is to the input layer of the first recognition model, and partial data the resolution of which is increased by super-resolution processing may be input to the input layer of the second recognition model.

The second recognition model may be implemented in another device. Second recognition model controller 114 controls an input to and an output from the second recognition model, and substantial processing of the second recognition model may be performed by the other device.

Alignment processor 115 is an information processor which aligns data, and may be constituted by an electric circuit. Specifically, alignment processor 115 aligns second intermediate output data from the second intermediate layer of the second recognition model, relative to first intermediate output data from the first intermediate layer of the first recognition model.

For example, alignment processor 115 may align the second intermediate output data by adjusting the position or the size of the second intermediate output data to the position or the size of a partial region in the first intermediate output data. Specifically, the alignment of the second intermediate output data relative to the first intermediate output data may be adjusting the position or the size of the second intermediate output data to the position or the size of a partial region in the first intermediate output data.

Specifically, alignment processor 115 may first determine a partial region in the first intermediate output data, according to the region of partial data which is a portion of sensor data.

The partial data in the sensor data is partial data determined by determiner 112, which is a portion of the sensor data. For example, alignment processor 115 may determine a partial region in the first intermediate output data such that the relative position and the relative size of the partial region in the first intermediate output data are the same as the relative position and the relative size of a region of the partial data in the sensor data.

Then, alignment processor 115 may associate the second intermediate output data with the determined partial region in the first intermediate output data in the alignment. Specifically, alignment processor 115 may map the second intermediate output data with the determined partial region in the first intermediate output data. Then, alignment processor 115 may align the second intermediate output data by adjusting the position or the size of the second intermediate output data to the position or the size of the determined partial region in the first intermediate output data.

Here, the partial region in the first intermediate output data corresponds to a partial data array which is a portion of the data array of the first intermediate output data. The region of partial data which is a portion of sensor data corresponds to a data array of the portion of data in the data array of sensor data. The data array may be a one-dimensional array, a two-dimensional array, a three-dimensional array, or another dimensional array.

For example, alignment processor 115 may adjust the position of the second intermediate output data by adjusting the position of a substantial data element in a data array. Alignment processor 115 may adjust the size of the second intermediate output data by interpolating or integrating data elements, for instance.

Generator 116 is an information processor which generates data, and may be constituted by an electric circuit. Specifically, generator 116 generates intermediate input data, from the first intermediate output data and the aligned second intermediate output data. The intermediate input data is input to a layer of the first recognition model subsequent to the first intermediate layer.

For example, generator 116 may generate intermediate input data by integrating the first intermediate output data and the aligned second intermediate output data. At that time, generator 116 may integrate the first intermediate output data and the aligned second intermediate output data by combining the first intermediate output data and the aligned second intermediate output data. At that time, generator 116 may replace the partial region in the first intermediate output data with the aligned second intermediate output data. Alternatively, generator 116 may integrate the first intermediate output data and the aligned second intermediate output data by connecting the first intermediate output data and the aligned second intermediate output data.

Selector 117 is an information processor which selects the first intermediate layer of the first recognition model, and may be constituted by an electric circuit. Specifically, selector 117 selects, from among a plurality of layers of the first recognition model, the first intermediate layer for integrating recognition processing on the entire sensor data and recognition processing on a portion of the sensor data.

For example, selector 117 may select the first intermediate layer according to a user instruction. Specifically, selector 117 may select the first intermediate layer according to an instruction obtained from a user via obtainer 111.

Alternatively, selector 117 may select the first intermediate layer according to information which the first recognition model and the second recognition model have learned during training. For example, the first recognition model and the second recognition model may be trained as one recognition model which is a combination of the two recognition models.

For such leaning, for example, input data included in learning data is input to the input layer of the first recognition model, and partial data which is a portion of the input data included in the learning data is input to the input layer of the second recognition model. Then, two recognition processes are integrated, and the first recognition model and the second recognition model are updated to cause the output data from the output layer of the first recognition model to be the same as the output data included in the learning data. Accordingly, the first recognition model and the second recognition model are trained.

In the above learning, which layer is to be selected as the first intermediate layer from among a plurality of layers of the first recognition model may be leaned as a parameter. Then, selector 117 may select the first intermediate layer according to the result of learning.

Alternatively, selector 117 may select the first intermediate layer according to computational resource information on a computational resource of information processing device 110. For example, the computational resource information indicates a permissible amount of usage of the computational resource of information processing device 110. Specifically, computational resource information may indicate the capability of the computational resource or may indicate a requested amount of computation designated for the computational resource by a user as the amount of computation for recognition processing.

For example, the smaller the permissible amount of usage of the computational resource of information processing device 110 is, the closer intermediate layer to the input layer selector 117 may select as the first intermediate layer. Accordingly, processes are integrated earlier, so that the amount of computation is reduced. Furthermore, the larger the permissible amount of usage of the computational resource of information processing device 110 is, the closer intermediate layer to the output layer selector 117 may select as the first intermediate layer. Accordingly, the proportion of two types of recognition processes being separately performed is increased, and thus recognition accuracy can be expected to be improved.

Selector 117 may select the second intermediate layer in the same manner as when selector 117 selects the first intermediate layer. Alternatively, selector 117 may select, according to the first intermediate layer, the second intermediate layer having the corresponding ordinal position to that of the first intermediate layer. Alternatively, selector 117 may select only the first intermediate layer and may not select the second intermediate layer. Accordingly, the second intermediate layer may be predetermined. Alternatively, selector 117 may select only the second intermediate layer, without selecting the first intermediate layer. Stated differently, the first intermediate layer may be predetermined.

Note that when the first intermediate layer and the second intermediate layer are predetermined, information processing device 110 may not include selector 117.

Figure 2:
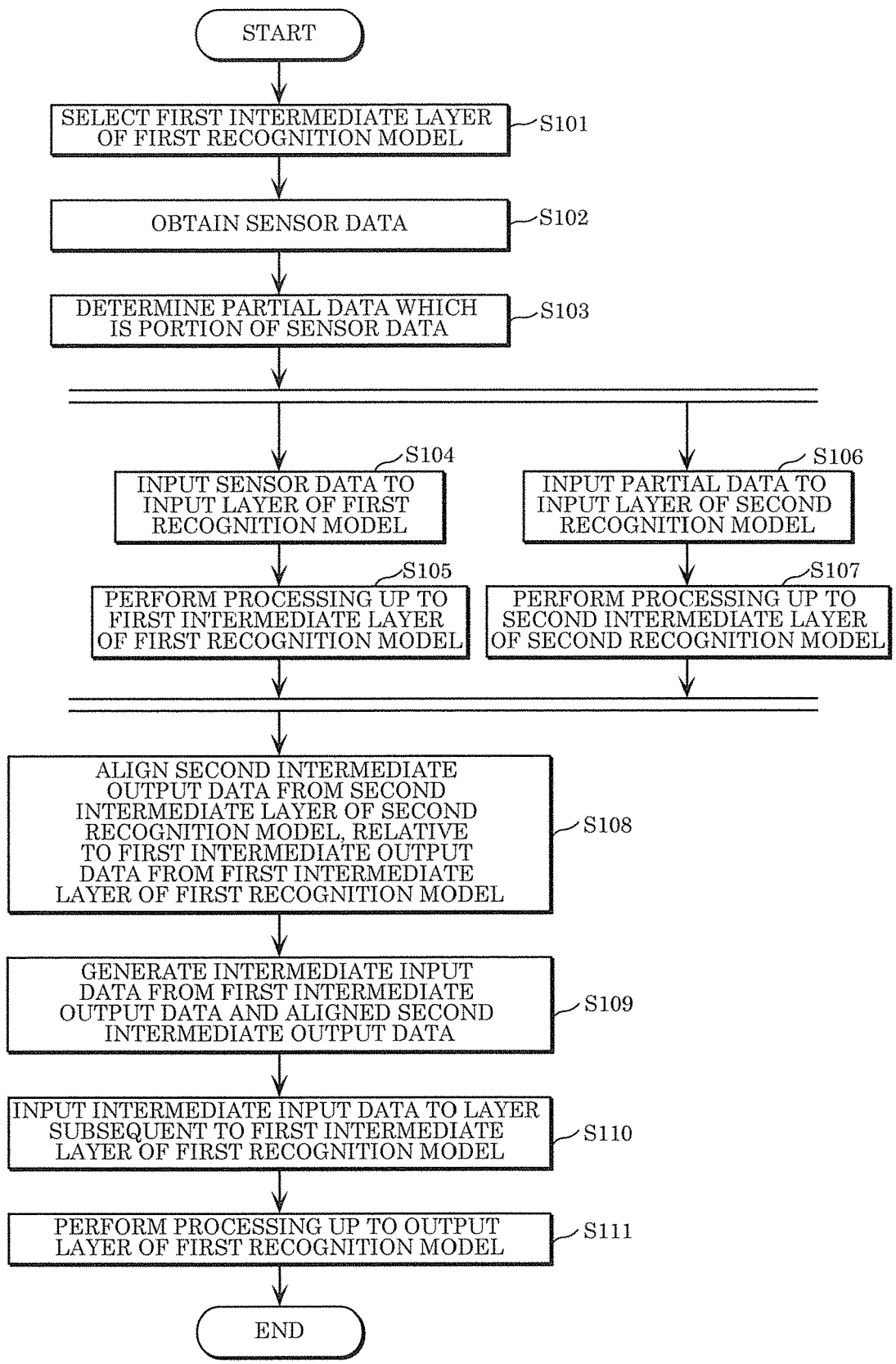
FIG. 2 is a flowchart illustrating operation of the information processing device according to the embodiment.

FIG. 2 is a flowchart illustrating operation of information processing device 110 illustrated in FIG. 1. For example, a plurality of elements in information processing device 110 illustrated in FIG. 1 perform operation illustrated in FIG. 2 in cooperation with each other.

First, selector 117 selects the first intermediate layer from among a plurality of layers of the first recognition model (S101). For example, selector 117 selects the first intermediate layer according to a user instruction, learned information, or computational resource information. Selector 117 may select the second intermediate layer from among a plurality of layers of the second recognition model, similarly to the first intermediate layer. Note that this processing does not need to be performed when the first intermediate layer and the second intermediate layer are predetermined.

Then, obtainer 111 obtains sensor data from sensor 100 (S102). For example, when sensor 100 is an image sensor and sensor data is an image, obtainer 111 obtains an image from sensor 100 as sensor data. Obtainer 111 may obtain sensor data from sensor 100 by wire communication or wireless communication. Obtainer 111 may obtain sensor data from sensor 100 directly or indirectly.

Next, determiner 112 determines partial data which is a portion of the sensor data (S103). For example, determiner 112 determines partial data which is a portion of the sensor data according to a user instruction, a parameter of sensor 100, information on a movable object on which sensor 100 is mounted, or the sensor data. When the sensor data is an image, determiner 112 determines a portion of the image as partial data which is a portion of the sensor data.

Next, first recognition model controller 113 inputs the sensor data to the input layer of the first recognition model (S104). Then, first recognition model controller 113 performs processing up to the first intermediate layer of the first recognition model (S105). On the other hand, second recognition model controller 114 inputs the partial data to the input layer of the second recognition model (S106). Then, second recognition model controller 114 performs processing up to the second intermediate layer of the second recognition model (S107).

In this example, processing (S104 and S105) by the first recognition model and processing (S106 and S107) by the second recognition model are performed in parallel.

Next, alignment processor 115 aligns second intermediate output data from the second intermediate layer of the second recognition model, relative to first intermediate output data from the first intermediate layer of the first recognition model (S108). For example, alignment processor 115 aligns the second intermediate output data by adjusting the position or the size of the second intermediate output data to the position or the size of a partial region in the first intermediate output data. The partial region in the first intermediate output data may be determined according to the region of the partial data in the sensor data.

Next, generator 116 generates intermediate input data from the first intermediate output data and the aligned second intermediate output data (S109). For example, generator 116 generates the intermediate input data by integrating the first intermediate output data and the aligned second intermediate output data. At that time, generator 116 may integrate the data by combining the first intermediate output data and the aligned second intermediate output data or by connecting the first intermediate output data and the aligned second intermediate output data.

Next, first recognition model controller 113 inputs intermediate input data to the layer of the first recognition model subsequent to the first intermediate layer (S110). For example, first recognition model controller 113 inputs intermediate input data to the intermediate layer of the first recognition model subsequent to the first intermediate layer, instead of the first intermediate output data from the first intermediate layer of the first recognition model. Then, first recognition model controller 113 performs processing up to the output layer of the first recognition model (S111).

Information processing device 110 performs recognition processing on sensor data through the above operation. For example, through the above operation, information processing device 110 can appropriately generate intermediate input data from the first intermediate output data and the aligned second intermediate output data. Accordingly, information processing device 110 can appropriately integrate the first intermediate output data obtained in the recognition processing on the entire sensor data and the second intermediate output data obtained in the recognition processing on partial data which is a portion of the sensor data. Thus, the intermediate input data obtained by appropriate integration can be used as an input to the intermediate layer of the recognition processing of the first recognition model, thus improving recognition performance. Furthermore, the recognition processing by the second recognition model can be terminated before the processing is completed, and thus the computational resource such as the amount of computation and memory usage can be inhibited from increasing.

Note that the above operation is an example and may be changed as appropriate. For example, determination of partial data (S103) may be performed parallel to the processing by the first recognition model (S104 and S105) before the processing by the second recognition model (S106 and S107). Further, alignment (S108) may be performed parallel to the processing by the first recognition model (S104 and S105) after the processing by the second recognition model (S106 and S107). After that, generation of intermediate input data (S109) may be further performed in parallel.

Alternatively, a plurality of processes (such as S104 to S107) may be performed sequentially, rather than in parallel.

The first recognition model may be expressed as a main recognition model, and the second recognition model may be expressed as a sub-recognition model. In the above configuration and operation, one main recognition model and one sub-recognition model are used. However, one main recognition model and a plurality of sub-recognition models may be used. For example, recognition processing on the entire sensor data and accurate recognition processing on a plurality of portions of the sensor data may be combined.

Then, second recognition model controller 114 may perform accurate recognition processing on the plurality of portions. Alternatively, information processing device 110 may include a plurality of recognition model controllers which perform accurate recognition processing on the plurality of portions.

Specific Example

The following describes more specific examples of a configuration and operation of information processing device 110 described above, for instance. Note that the configuration and operation, for instance, of information processing device 110 are not limited to the following examples.

FIG. 3A is a schematic diagram illustrating the first recognition model and the second recognition model which are used in information processing device 110 illustrated in FIG. 1. Specifically, FIG. 3A illustrates sensor data 201, partial data 202, first recognition model 210, second recognition model 220, and output data 203 and 204, for instance.

Sensor data 201 is obtained from sensor 100. Specifically, obtainer 111 included in information processing device 110 obtains sensor data 201 from sensor 100. For example, sensor data 201 is an image.

Partial data 202 is a portion of sensor data 201. Determiner 112 determines partial data 202 which is a portion of sensor data 201. If sensor data 201 is an image, partial data 202 is a partial image which is a portion of the image corresponding to sensor data 201.

First recognition model 210 is controlled by first recognition model controller 113. For example, first recognition model 210 is implemented in first recognition model controller 113. First recognition model 210 includes input layer 211, intermediate layers 212 to 214, and output layer 215, as a plurality of processing layers.

Input layer 211 is an input layer of first recognition model 210. Sensor data 201 is input to input layer 211 by first recognition model controller 113. Then, intermediate data is output from input layer 211 according to sensor data 201 input to input layer 211. Note that sensor data 201 is processed so as to have a predetermined resolution or a predetermined size by being compressed, for instance.

Intermediate layers 212 to 214 are intermediate layers of first recognition model 210. Intermediate data is input to each of intermediate layers 212 to 214. Then, new intermediate data is output from each of intermediate layers 212 to 214, according to the input intermediate data.

Output layer 215 is an output layer of first recognition model 210. Intermediate data is input to output layer 215. Then, output data 203 is output from output layer 215 according to the intermediate data input to output layer 215.

Output data 203 is data indicating the result of recognition processing performed by first recognition model 210. Basically, output data 203 indicates the result of recognition processing in a user-understandable format.

Second recognition model 220 is controlled by second recognition model controller 114. For example, second recognition model 220 is implemented in second recognition model controller 114. Second recognition model 220 includes input layer 221, intermediate layers 222 to 224, and output layer 225, as a plurality of processing layers.

Input layer 221 is an input layer of second recognition model 220. Partial data 202 is input to input layer 221 by second recognition model controller 114. Then, intermediate data is output from input layer 221 according to partial data 202 input to input layer 221. Note that partial data 202 may not be compressed or may be compressed similarly to sensor data 201.

Intermediate layers 222 to 224 are intermediate layers of second recognition model 220. Intermediate data is input to each of intermediate layers 222 to 224. Then, new intermediate data is output from each of intermediate layers 222 to 224, according to the input intermediate data.

Output layer 225 is an output layer of second recognition model 220. Intermediate data is input to output layer 225. Then, output data 204 is output from output layer 225, according to the intermediate data input to output layer 225.

Output data 204 indicates the result of recognition processing performed by second recognition model 220. Basically, output data 204 indicates the result of recognition processing in a user-understandable format.

Partial data 202 input to input layer 221 of second recognition model 220 is finer than sensor data 201 input to input layer 211 of first recognition model 210. Specifically, when sensor data 201 is an image, the resolution of partial data 202 input to input layer 221 of second recognition model 220 is higher than the resolution of sensor data 201 input to input layer 211 of first recognition model 210.

For example, the resolution of sensor data 201 is decreased to reduce the amount of processing, and the resultant data is input to input layer 211 of first recognition model 210. On the other hand, partial data 202 is input to input layer 221 of second recognition model 220 without decreasing the resolution thereof, to inhibit deterioration of recognition accuracy. Alternatively, sensor data 201 may be input to input layer 211 of first recognition model 210 as it is, whereas the resolution of partial data 202 may be increased by super-resolution processing, and the resultant data may be input to input layer 221 of second recognition model 220.

Even when sensor data 201 is not an image, data precision may be changed by quantizing sensor data 201, for instance.

Further, as illustrated in FIG. 3A, the first intermediate output data which is intermediate data output from intermediate layer 213 of first recognition model 210 and the second intermediate output data which is intermediate data output from intermediate layer 223 of second recognition model 220 are integrated, and the integrated data is input to intermediate layer 214 of first recognition model 210. At that time, the second intermediate output data is aligned relative to the first intermediate output data. Then, the first intermediate output data and the aligned second intermediate output data are integrated, and the integrated data is input to intermediate layer 214. Accordingly, two recognition processes are integrated appropriately.

Note that intermediate layer 213 for integration may be predetermined from among intermediate layers 212 to 214 of first recognition model 210 or may be selected by selector 117 from among intermediate layers 212 to 214. Similarly, intermediate layer 223 for integration may also be predetermined from among intermediate layers 222 to 224 of second recognition model 220 or may be selected by selector 117 from among intermediate layers 222 to 224.

Output layer 225 may not be implemented in second recognition model controller 114, and output data 204 may not be output. Further, when intermediate layer 223 for integration is predetermined from among intermediate layers 222 to 224 of second recognition model 220, intermediate layer 224 subsequent to intermediate layer 223 may not be implemented in second recognition model controller 114.

In this example, first recognition model 210 has three intermediate layers 212 to 214, but may have two or less intermediate layers, or may have four or more intermediate layers. Similarly, second recognition model 220 has three intermediate layers 222 to 224, but may have two or less intermediate layers, or may have four or more intermediate layers.

Figure 3B:
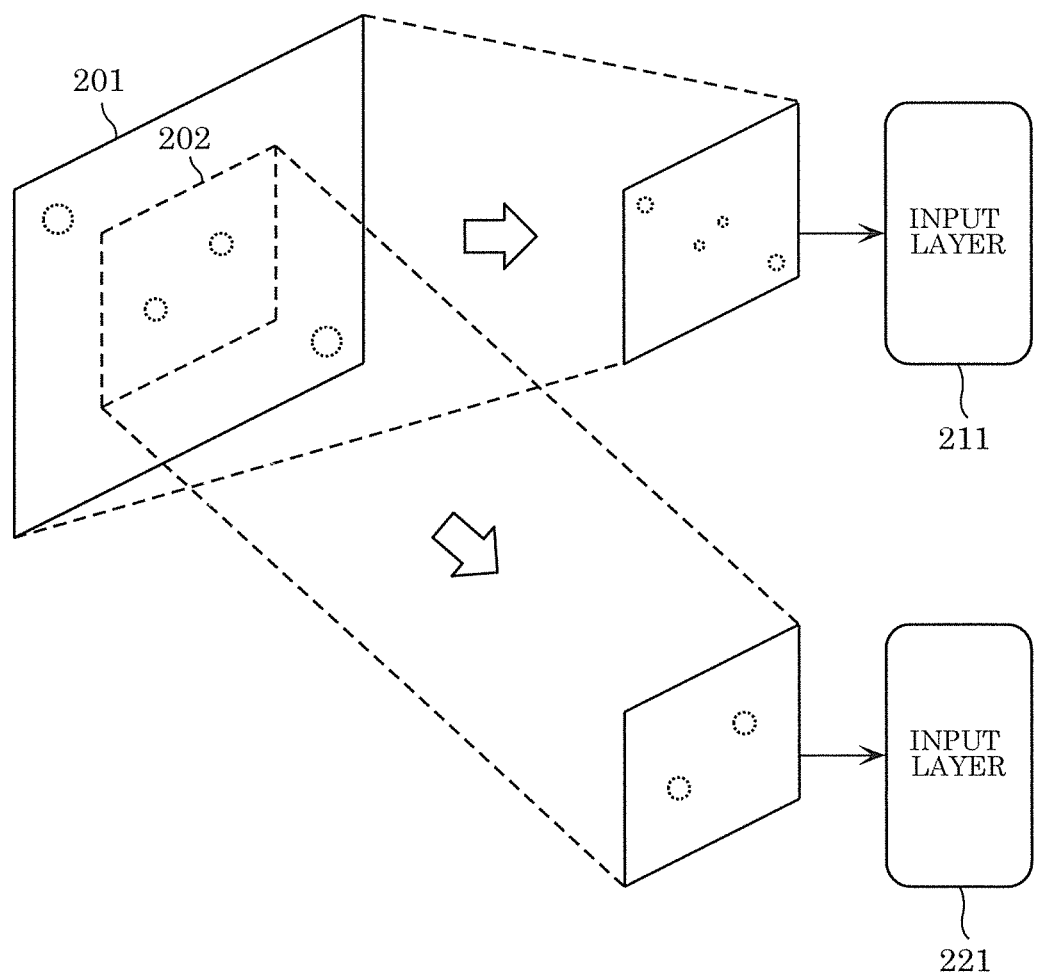
FIG. 3B is a schematic diagram illustrating sensor data and partial data in the embodiment.

FIG. 3B is a schematic diagram illustrating sensor data 201 and partial data 202 illustrated in FIG. 3A. For example, sensor data 201 is processed to have a predetermined resolution or a predetermined size by being compressed, for instance, and is input to input layer 211 of first recognition model 210. For example, partial data 202 which is a portion of sensor data 201 is input to input layer 221 of second recognition model 220, without being compressed.

Figure 4:
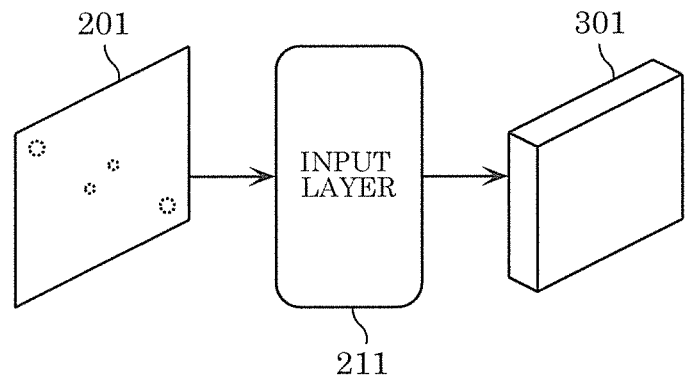
FIG. 4 is a schematic diagram illustrating an input to and an output from an input layer in the embodiment.

FIG. 4 is a schematic diagram illustrating an input to and an output from input layer 211 illustrated in FIG. 3A. Sensor data 201 is input to input layer 211, and intermediate data 301 is output from input layer 211. Intermediate data 301 may also be referred to as a feature map and may be represented by a three-dimensional data array. Intermediate data 301 may have feature quantities as data elements of the data array. A three-dimensional data array is an example, and intermediate data 301 may be represented by a different dimensional data array.

For example, intermediate data 301 indicates features derived from sensor data 201. Basically, when the position of the partial region in intermediate data 301 is relatively the same as the position of the partial region in sensor data 201, the partial region in intermediate data 301 indicates features derived from the partial region in sensor data 201.

FIG. 4 illustrates an input to and an output from input layer 211 of first recognition model 210, yet an input to and an output from input layer 221 of second recognition model 220 are similar to the input to and the output from input layer 211 of first recognition model 210. Note that partial data 202 which is a portion of sensor data 201 is input to input layer 221 of second recognition model 220. For example, intermediate data which indicates features corresponding to partial data 202 is output from input layer 221.

Figure 5:
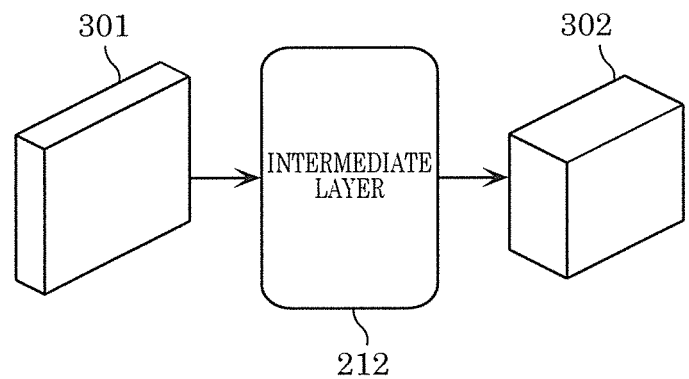
FIG. 5 is a schematic diagram illustrating an input to and an output from an intermediate layer in the embodiment.

FIG. 5 is a schematic diagram illustrating an input to and an output from intermediate layer 212 illustrated in FIG. 3A. Intermediate data 301 is input to intermediate layer 212, and intermediate data 302 is output from intermediate layer 212. Intermediate data 301 input to intermediate layer 212 may also be expressed as intermediate input data. Intermediate data 302 output from intermediate layer 212 is also expressed as intermediate output data.

Intermediate data 302 output from intermediate layer 212 may have the same format as that of intermediate data 301 input to intermediate layer 212. Note that intermediate data 302 output from intermediate layer 212 may have a format different from that of intermediate data 301 input to intermediate layer 212. For example, intermediate data 301 and intermediate data 302 may be represented by three-dimensional data arrays which have different numbers of elements.

For example, intermediate data 302 indicates features derived from intermediate data 301. Basically, when the position of a partial region in intermediate data 302 is relatively the same as the position of the partial region in intermediate data 301, the partial region in intermediate data 302 indicates the features derived from the partial region in intermediate data 301.

FIG. 5 illustrates an input to and an output from intermediate layer 212 of first recognition model 210, yet inputs to and outputs from other intermediate layers 213, 214, and 222 to 224 are also similar to the input to and the output from intermediate layer 212 of first recognition model 210. For example, data content different from intermediate data 301 and 302 are input to and output from other intermediate layers 213, 214, and 222 to 224 in the same format as that of intermediate data 301 and 302.

Figure 6:
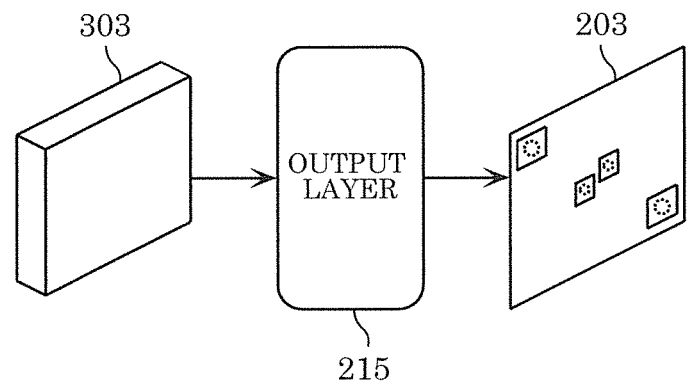
FIG. 6 is a schematic diagram illustrating an input to and an output from an output layer in the embodiment.

FIG. 6 is a schematic diagram illustrating an input to and an output from output layer 215 illustrated in FIG. 3A. Intermediate data 303 is input to output layer 215, and output data 203 is output from output layer 215. Intermediate data 303 input to output layer 215 may also be expressed as intermediate input data. Output data 203 output from output layer 215 is also expressed as final output data.

Intermediate data 303 input to output layer 215 may have the same format as that of intermediate data 301 input to intermediate layer 212. Note that intermediate data 303 input to output layer 215 may have a format different from that of intermediate data 301 input to intermediate layer 212. For example, intermediate data 301 and intermediate data 303 may be represented by three-dimensional data arrays which have different numbers of elements. The same also applies to the relation between intermediate data 302 and intermediate data 303.

For example, output data 203 is derived from intermediate data 303, and indicates the result of the recognition processing by first recognition model 210.

FIG. 6 illustrates an input to and an output from output layer 215 of first recognition model 210, yet an input to and an output from output layer 225 of second recognition model 220 are also similar to the input to and the output from output layer 215 of first recognition model 210. Note that intermediate data derived from partial data 202 which is a portion of sensor data 201 via input layer 221 and intermediate layers 222 to 224 is input to output layer 225 of second recognition model 220. For example, output data 204 indicating the result of recognition processing by second recognition model 220 is output from output layer 225.

Figure 7:
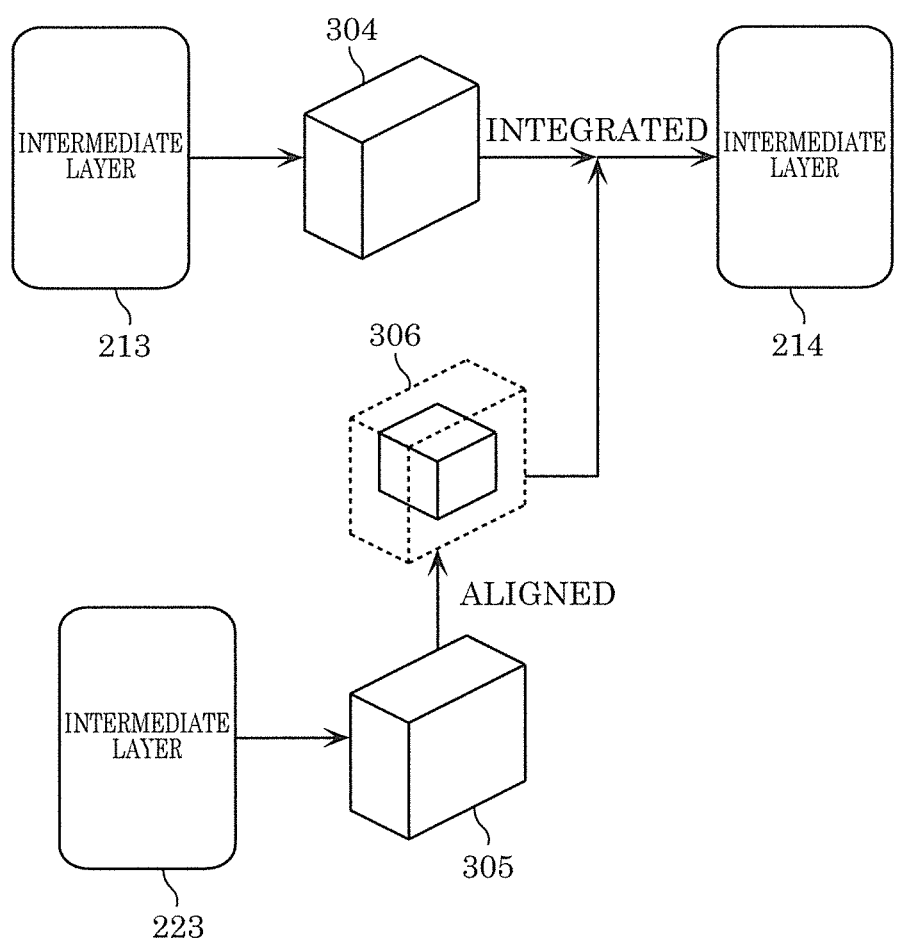
FIG. 7 is a schematic diagram illustrating the alignment in the embodiment.

FIG. 7 is a schematic diagram illustrating the alignment performed by information processing device 110 illustrated in FIG. 1. For example, first recognition model controller 113 causes intermediate data 304 to be output from intermediate layer 213 of first recognition model 210. Second recognition model controller 114 causes intermediate data 305 to be output from intermediate layer 223 of second recognition model 220. Alignment processor 115 aligns intermediate data 305 relative to intermediate data 304, and generates aligned intermediate data 305 as intermediate data 306.

For example, alignment processor 115 aligns intermediate data 305 by adjusting the position or the size of intermediate data 305 to the position or the size of the partial region in intermediate data 304.

Specifically, alignment processor 115 may determine the partial region in intermediate data 304 according to the region of partial data 202 in sensor data 201. More specifically, alignment processor 115 may determine the partial region in intermediate data 304, to cause a relative area of the partial region in intermediate data 304 to be the same as the relative area of the region of partial data 202 in sensor data 201.

Here, the partial region in intermediate data 304 corresponds to a partial data array which is a portion of the data array of intermediate data 304. The region of partial data 202 which is a portion of sensor data 201 corresponds to the data array of partial data 202 in the data array of sensor data 201.

For example, alignment processor 115 may adjust the position of intermediate data 305 by adjusting the positions of data elements in the data array. Alignment processor 115 may adjust the size of intermediate data 305 by interpolating or integrating data elements, for instance.

Then, intermediate data 304 and intermediate data 306 obtained by aligning intermediate data 305 are integrated, and the integrated data is input to intermediate layer 214. Information processing device 110 can appropriately integrate intermediate data 304 and intermediate data 306 by alignment.

Note that intermediate data 305 is aligned relative to intermediate data 304 to incorporate intermediate data 305 into a partial region in intermediate data 306 which corresponds to intermediate data 304. Other regions of intermediate data 306 may be empty or filled with zeros.

Alignment processor 115 may expand intermediate data 304 by interpolating data elements, for instance, and may position intermediate data 305 relative to expanded intermediate data 304. Accordingly, this maintains features included in intermediate data 305 without reducing the features, in aligning intermediate data 305.

Figure 8:
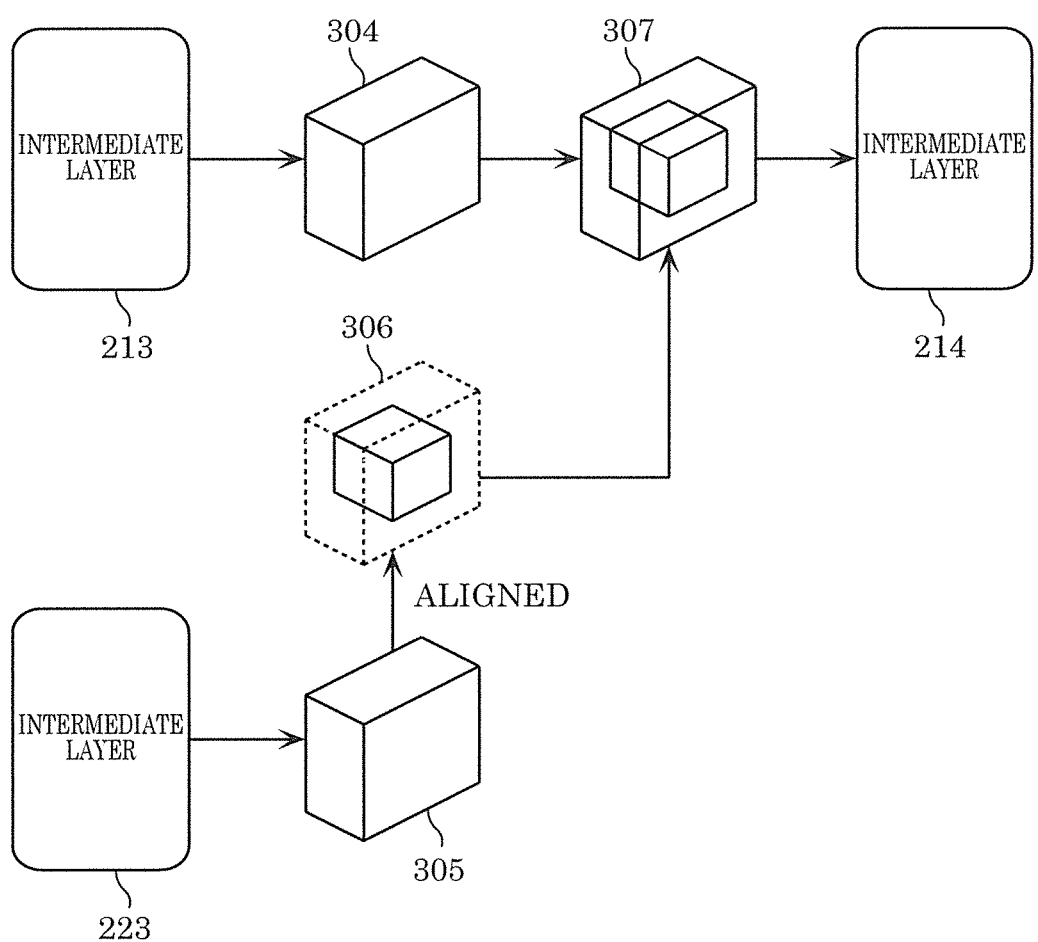
FIG. 8 is a schematic diagram illustrating an integrating process based on a combining process in the embodiment.

FIG. 8 is a schematic diagram illustrating an integrating process based on a combining process performed by information processing device 110 illustrated in FIG. 1. For example, generator 116 integrates intermediate data 304 and intermediate data 306 by combining intermediate data 304 and intermediate data 306. Then, generator 116 generates intermediate data 307 obtained by integrating intermediate data 304 and intermediate data 306.

More specifically, generator 116 may add up or average intermediate data 304 and intermediate data 306 for each element of the data arrays. Generator 116 may weight and add up intermediate data 304 and intermediate data 306 for each element of the data arrays. Alternatively, generator 116 may combine intermediate data 304 and intermediate data 306 by replacing a partial region in intermediate data 304 with intermediate data 306.

Accordingly, information processing device 110 can appropriately mix features obtained from sensor data 201 and features obtained from partial data 202, and input the mixed features to intermediate layer 214.

Figure 9:
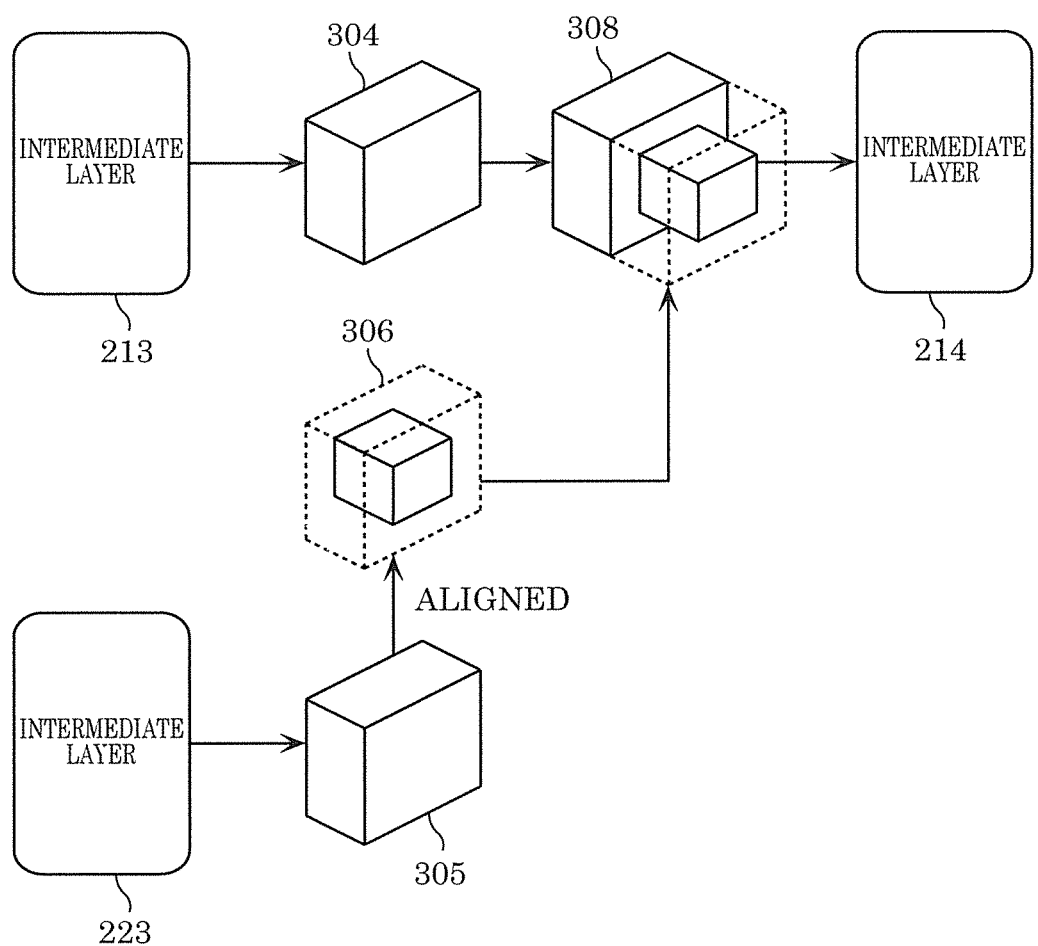
FIG. 9 is a schematic diagram illustrating an integrating process based on a connecting process in the embodiment.

FIG. 9 is a schematic diagram illustrating an integrating process based on a connecting process performed by information processing device 110 illustrated in FIG. 1. For example, generator 116 integrates intermediate data 304 and intermediate data 306 by connecting intermediate data 304 and intermediate data 306. Then, generator 116 generates intermediate data 308 obtained by integrating intermediate data 304 and intermediate data 306.

More specifically, generator 116 connects the data array of intermediate data 304 and the data array of intermediate data 306. Then, for example, generator 116 generates intermediate data 308 which has twice as many number of elements as the number of elements of the data array of intermediate data 304.

Accordingly, information processing device 110 can maintain most of the features obtained from sensor data 201 and most of the features obtained from partial data 202, and can input the features to intermediate layer 214. Note that generator 116 may integrate neighboring data elements in the data array of intermediate data 308, and may make the format of the data array of intermediate data 308 the same as the format of the data array of intermediate data 304.

In the specific example, information processing device 110 can appropriately generate intermediate data 307 or 308, for instance, from intermediate data 304 and aligned intermediate data 305. Stated differently, information processing device 110 can appropriately integrate intermediate data 304 obtained in the recognition processing on entire sensor data 201, and intermediate data 305 obtained in the recognition processing on partial sensor data 201.

Specifically, information processing device 110 can appropriately integrate recognition processing on entire sensor data 201 and recognition processing on partial sensor data 201. Thus, information processing device 110 can efficiently perform recognition processing on sensor data 201.

For example, when sensor 100 is an image sensor and sensor data 201 is an image, it is not easy to efficiently recognize, from an image, various objects having different sizes. For example, accurate recognition processing for recognizing a small object involves a large amount of processing, and thus a processing delay occurs. On the other hand, recognition processing that involves a small amount of processing results in lower recognition accuracy.

Information processing device 110 can recognize a large object from the entire image, and can recognize a small object from a portion of the image by combining recognition processing on the entire image and recognition processing on the portion of the image. Accordingly, information processing device 110 can efficiently recognize, from the image, various objects having different sizes. Information processing device 110 can appropriately integrate two types of recognition processes, and thus can further inhibit the amount of processing.

Even when sensor 100 is not an image sensor and sensor data 201 is not an image, similarly, information processing device 110 can efficiently perform recognition processing on sensor data 201.

Note that as described above, the configuration and operation, for instance, of information processing device 110 are not limited to those in the specific example. For example, data having a format different from the format mentioned above may be input to and output from input layers 211 and 221, intermediate layers 212 to 214 and 222 to 224, and output layers 215 and 225. For example, input data may be output as it is from input layers 211 and 221 to intermediate layers 212 and 222, respectively. Also, values indicating the final features may be output from intermediate layers 214 and 224 to output layers 215 and 225, respectively.

Example of Application

The following describes an example in which information processing device 110 illustrated in FIG. 1 is used to control a movable object as an example of application.

Figure 10:
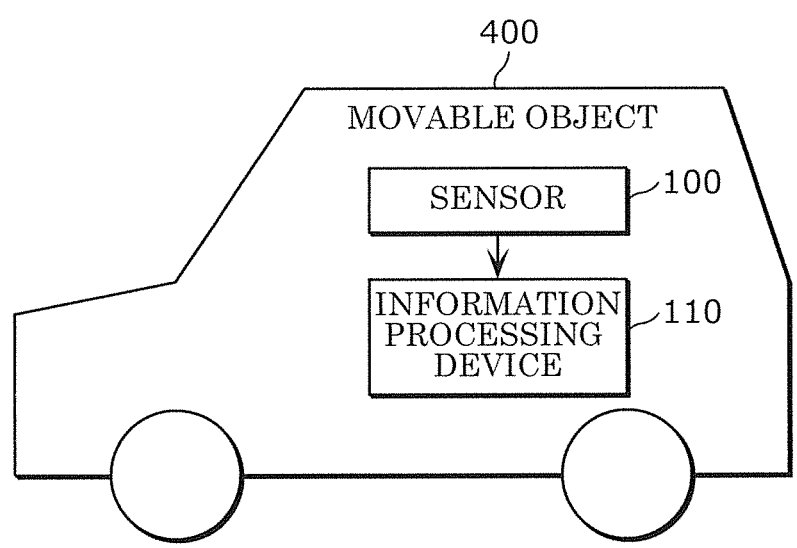
FIG. 10 is a schematic diagram illustrating an example of application of the information processing device according to the embodiment.

FIG. 10 is a schematic diagram illustrating an example of application of information processing device 110 illustrated in FIG. 1. In the example of application, sensor 100 and information processing device 110 are mounted on movable object 400 which is a vehicle. Sensor 100 is an image sensor and outputs an image of the outside of movable object 400. Information processing device 110 integrates recognition processing on the entire image and recognition processing on a portion of the image, and appropriately performs recognition processing on the image. Then, information processing device 110 reflects the result of the recognition processing in the control of movable object 400.

For example, information processing device 110 may move movable object 400 along a recognized road. Alternatively, information processing device 110 may stop the movement of movable object 400 upon recognizing an object ahead of movable object 400.

In the recognition processing on an image, determiner 112 of information processing device 110 may determine a partial image which is a portion of the image and on which recognition processing is to be accurately performed, according to information on the operation of movable object 400 or information on the control over movable object 400. For example, when movable object 400 turns left or when movable object 400 is caused to turn left by being controlled, determiner 112 may determine a left portion of the image as a partial image on which recognition processing is to be accurately performed.

Determiner 112 of information processing device 110 may determine a partial image which is a portion of an image and on which recognition processing is to be more accurately performed, using the position and the orientation of sensor 100 as parameters of sensor 100. For example, according to the position and the orientation of sensor 100 in movable object 400, determiner 112 may determine a partial image which is a portion of an image and in which a road is more likely to be shown, as a partial image on which recognition processing is to be more accurately performed.

Note that in this example of application, movable object 400 is a vehicle, but is not limited to a vehicle. For example, movable object 400 may be an aircraft. Information processing device 110 may not be mounted on movable object 400. In the outside of movable object 400, information processing device 110 obtains sensor data from sensor 100, and may perform remote control of movable object 400, according to the result of recognition processing on the sensor data.

Although the above is a description of aspects of information processing device 110 based on the embodiments, the aspects of information processing device 110 are not limited to the embodiments and others. Modifications that may be conceived by a person skilled in the art may be applied to the embodiments and others, and a plurality of elements in the embodiments and others may be arbitrarily combined. For example, processing performed by a specific element in the embodiments and others may be performed by a different element instead of a specific element. The order of processes may be changed or performed in parallel.

An information processing method which includes steps performed by the elements of information processing device 110 may be performed by an optional device or system. For example, the information processing method may be performed by a computer which includes a processor, a memory, and an input output circuit, for instance. At that time, the information processing method may be performed by the computer executing a program for causing the computer to perform the information processing method. The program may be recorded on a non-transitory computer-readable recording medium.

For example, the above program causes a computer to perform an information processing method which includes: obtaining sensor data from a sensor; determining partial data which is a portion of the sensor data; inputting the sensor data to an input layer of a first neural network recognition model; inputting the partial data to an input layer of a second neural network recognition model; aligning second intermediate output data from a second intermediate layer of the second neural network recognition model, relative to first intermediate output data from a first intermediate layer of the first neural network recognition model; generating intermediate input data from the first intermediate output data and the second intermediate output data aligned; and inputting the intermediate input data to a third intermediate layer of the first neural network recognition model subsequent to the first intermediate layer.

The elements of information processing device 110 may be achieved by dedicated hardware, by general-purpose hardware which executes the above program, for instance, or by a combination of these. The general-purpose hardware may be achieved by, for instance, a memory having stored therein the program, and a general-purpose processor which reads from the memory and executes the program. Here, the memory may be a semiconductor memory or a hard disk, for instance, and the general-purpose processor may be a CPU, for instance.

Dedicated hardware may include a memory and a dedicated processor, for instance. For example, the dedicated processor may perform the above information processing method, with reference to the memory having stored therein information on the first recognition model and the second recognition model.

The elements of information processing device 110 may be electric circuits, as stated in the embodiments, for instance. The electric circuits may constitute one electric circuit as a whole, or may be separate electric circuits. The electric circuits may correspond to dedicated hardware or may correspond to the general-purpose hardware which executes the above program, for instance.

The following describes a basic configuration and a typical variation, for instance, of information processing device 110 according to an aspect of the present disclosure. These may be combined with each other or combined with a portion of the above embodiment, for instance.

(1) Information processing device 110 according to an aspect of the present disclosure includes obtainer 111, determiner 112, first recognition model controller 113, second recognition model controller 114, alignment processor 115, and generator 116.

Obtainer 111 obtains sensor data from sensor 100. Determiner 112 determines partial data which is a portion of the sensor data. First recognition model controller 113 inputs the sensor data to an input layer of a first neural network recognition model. Second recognition model controller 114 inputs the partial data to an input layer of a second neural network recognition model.

Alignment processor 115 aligns second intermediate output data from a second intermediate layer of the second neural network recognition model, relative to first intermediate output data from the first intermediate layer of the first neural network recognition model. Generator 116 generates intermediate input data from the first intermediate output data and the aligned second intermediate output data. Then, first recognition model controller 113 inputs intermediate input data to a third intermediate layer of the first neural network recognition model subsequent to the first intermediate layer.

Accordingly, information processing device 110 can appropriately generate intermediate input data from the first intermediate output data and the aligned second intermediate output data. Accordingly, information processing device 110 can appropriately integrate the first intermediate output data obtained in recognition processing on the entire sensor data and the second intermediate output data obtained in the recognition processing on the portion of the sensor data. Accordingly, the intermediate input data obtained by appropriate integration can be used as an input to the third intermediate layer of the recognition processing by the first neural network recognition model, and thus recognition performance can be improved. Also, recognition processing by the second neural network recognition model can be terminated before the processing is completed, and thus an increase in the computational resource such as an amount of computation or memory usage can be inhibited.

(2) For example, sensor 100 is an image sensor and the sensor data is an image. Accordingly, information processing device 110 can appropriately integrate the first intermediate output data obtained in the recognition processing on the entire image and the second intermediate output data obtained in the recognition processing on a portion of the image. In the image recognition processing that uses a recognition model, the resolution or the size of an input image is often compressed. The compression distorts or destroys an object shown in the image. On the other hand, when the input image is not compressed, the amount of computation and memory usage increase. In view of this, since information processing device 110 is applied to image recognition processing, an increase in the computational resource can be inhibited while improving image recognition performance.

(3) For example, alignment processor 115 aligns the second intermediate output data by adjusting a position or a size of the second intermediate output data to a position or a size of a first region which is a partial region in the first intermediate output data. Accordingly, information processing device 110 can appropriately align the second intermediate output data according to a partial region in the first intermediate output data.

(4) For example, alignment processor 115 determines the first region according to a region of the partial data in the sensor data, and aligns the second intermediate output data by adjusting the position or the size of the second intermediate output data to the position or the size of the determined first region. Accordingly, information processing device 110 can determine the partial region in the first intermediate output data corresponding to the region of the partial data in the sensor data. Accordingly, the second intermediate output data output by the second recognition model that uses the partial data as an input can be appropriately aligned.

(5) For example, information processing device 110 further includes: selector 117 which selects the first intermediate layer from among a plurality of layers of the first neural network recognition model. Accordingly, information processing device 110 can adaptively select the first intermediate layer for integrating intermediate data obtained in recognition processing on the entire sensor data and intermediate data obtained in recognition processing on the portion of the sensor data.

(6) For example, selector 117 selects the first intermediate layer according to information which the first neural network recognition model and the second neural network recognition model have learned during training. Accordingly, information processing device 110 can select the first intermediate layer suitable for the first neural network recognition model and the second neural network recognition model.

(7) For example, selector 117 selects the first intermediate layer according to computational resource information on a computational resource of information processing device 110. Accordingly, information processing device 110 can select the first intermediate layer suitable for a computational resource that can be used.

(8) For example, determiner 112 determines the partial data according to a parameter of sensor 100. Accordingly, information processing device 110 can determine, from the parameter of sensor 100, the partial data on which recognition processing is to be performed separately from the entire sensor data and which is expected to contribute to the improvement in recognition performance.

(9) For example, determiner 112 determines the partial data according to information indicating operation of or control over a movable object on which sensor 100 is mounted. Accordingly, information processing device 110 can determine, from operation of or control over a movable object on which sensor 100 is mounted, the partial data on which recognition processing is to be performed separately from the entire sensor data and which is expected to contribute to the improvement in recognition performance.

(10) According to an information processing method according to an aspect of the present disclosure, sensor data is obtained from sensor 100 (S102). Partial data which is a portion of the sensor data is determined (S103). The sensor data is input to an input layer of a first neural network recognition model (S104). The partial data is input to an input layer of a second neural network recognition model (S106).

Second intermediate output data from a second intermediate layer of the second neural network recognition model is aligned relative to first intermediate output data from a first intermediate layer of the first neural network recognition model (S108). Intermediate input data is generated from the first intermediate output data and the second intermediate output data aligned (S109). The intermediate input data is input to a third intermediate layer of the first neural network recognition model subsequent to the first intermediate layer (S110).

Accordingly, the intermediate input data can be appropriately generated from the first intermediate output data and the aligned second intermediate output data. Namely, the first intermediate output data obtained in the recognition processing on the entire sensor data, and the second intermediate output data obtained in the recognition processing on a portion of the sensor data can be integrated appropriately. Accordingly, the intermediate input data obtained by appropriate integration can be used as an input to the third intermediate layer in the recognition processing by the first neural network recognition model, and recognition performance can be improved. The recognition processing by the second neural network recognition model can be terminated before the processing is completed, and thus an increase in the computational resource such as an amount of computation and memory usage can be inhibited.

(11) A program according to an aspect of the present disclosure is a program for causing a computer to perform the above information processing method. Accordingly, the computer can perform the above information processing method in accordance with a program.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for, for instance, an information processing device which perform recognition processing on sensor data, and is applicable to an image recognition system and an automated driving system, for instance.

What is claimed is:

1. An information processing device, comprising:
a processor configured to:
obtain sensor data from a sensor;
determine partial data which is a portion of the sensor data;
input the sensor data to an input layer of a first neural network recognition model;
input only the partial data of the sensor data to an input layer of a second neural network recognition model;
align second intermediate output data from a second intermediate layer of the second neural network recognition model, relative to first intermediate output data from a first intermediate layer of the first neural network recognition model;
generate intermediate input data from the first intermediate output data and the aligned second intermediate output data; and
input the intermediate input data to a third intermediate layer of the first neural network recognition model subsequent to the first intermediate layer, wherein
in aligning the second intermediate output data, a position or a size of an entire data array of the second intermediate output data is adjusted to a position or a size of a first region, the first region being a partial data array in a data array of the first intermediate output data.

2. The information processing device according to claim 1, wherein
the sensor is an image sensor, and
the sensor data is an image.

3. The information processing device according to claim 1, wherein
in aligning the second intermediate output data, the first region is determined according to a region of the partial data in the sensor data, and the position or the size of the entire data array of the second intermediate output data is adjusted to the position or the size of the determined first region.

4. The information processing device according to claim 1, wherein
the processor is further configured to select the first intermediate layer from among a plurality of layers of the first neural network recognition model.

5. The information processing device according to claim 4, wherein
the processor is further configured to select the first intermediate layer according to information which the first neural network recognition model and the second neural network recognition model have learned during training.

6. The information processing device according to claim 4, wherein
the processor is further configured to select the first intermediate layer according to computational resource information on a computational resource of the information processing device.

7. The information processing device according to claim 1, wherein
the processor is further configured to determine the partial data according to a parameter of the sensor.

8. The information processing device according to claim 1, wherein
the processor is further configured to determine the partial data according to information indicating operation of or control over a movable object on which the sensor is mounted.

9. An information processing method, comprising:
obtaining sensor data from a sensor;
determining partial data which is a portion of the sensor data;
inputting the sensor data to an input layer of a first neural network recognition model;
inputting only the partial data of the sensor data to an input layer of a second neural network recognition model;
aligning second intermediate output data from a second intermediate layer of the second neural network recognition model, relative to first intermediate output data from a first intermediate layer of the first neural network recognition model;
generating intermediate input data from the first intermediate output data and the aligned second intermediate output data; and
inputting the intermediate input data to a third intermediate layer of the first neural network recognition model subsequent to the first intermediate layer, wherein
in aligning the second intermediate output data, a position or a size of an entire data array of the second intermediate output data is adjusted to a position or a size of a first region, the first region being a partial data array in a data array of the first intermediate output data.

10. A non-transitory computer-readable recording medium having a program recorded thereon for causing a computer to perform the information processing method according to claim 9.

* * * * *